(12) United States Patent
Lin

(10) Patent No.: US 12,486,670 B1
(45) Date of Patent: Dec. 2, 2025

(54) SOLAR OUTDOOR SUNSHADE

(71) Applicant: Zhicheng Lin, Huazhou (CN)

(72) Inventor: Zhicheng Lin, Huazhou (CN)

( * ) Notice: Subject to any disclaimer, the term of this patent is extended or adjusted under 35 U.S.C. 154(b) by 0 days.

(21) Appl. No.: 19/031,844

(22) Filed: Jan. 18, 2025

(30) Foreign Application Priority Data

Jan. 8, 2025 (CN) .......................... 202520040003.1

(51) Int. Cl.
| | |
|---|---|
| *E04F 10/10* | (2006.01) |
| *F21S 8/04* | (2006.01) |
| *F21V 33/00* | (2006.01) |
| *H02S 20/20* | (2014.01) |
| *F21Y 115/10* | (2016.01) |
| *H02J 7/00* | (2006.01) |

(52) U.S. Cl.
CPC ................ *E04F 10/10* (2013.01); *F21S 8/04* (2013.01); *F21V 33/006* (2013.01); *H02S 20/20* (2014.12); *F21Y 2115/10* (2016.08); *H02J 7/0042* (2013.01)

(58) Field of Classification Search
CPC ..................................................... E04F 10/10
See application file for complete search history.

(56) References Cited

U.S. PATENT DOCUMENTS

| | | | | |
|---|---|---|---|---|
| 4,527,355 A | * | 7/1985 | Numakami | E04F 10/10 49/90.1 |
| 5,732,507 A | * | 3/1998 | Edwards | E06B 7/086 49/82.1 |
| 10,851,544 B1 | * | 12/2020 | Volin | E04F 10/10 |
| 11,085,196 B1 | * | 8/2021 | Volin | E06B 9/42 |
| 11,473,311 B1 | * | 10/2022 | Fitzgerald | E04F 10/10 |

FOREIGN PATENT DOCUMENTS

| | | | | | |
|---|---|---|---|---|---|
| CN | 104594574 | A | * | 5/2015 | ............. E04F 10/10 |
| CN | 110130593 | A | * | 8/2019 | ............. E04B 1/66 |
| CN | 211448433 | U | * | 9/2020 | |
| CN | 213015601 | U | * | 4/2021 | |
| CN | 216043002 | U | * | 3/2022 | ............. E04F 10/10 |
| CN | 218714478 | U | * | 3/2023 | ............. E04F 10/10 |
| DE | 2453018 | A1 | * | 11/1974 | |
| FR | 3055637 | A1 | * | 3/2018 | ............. E04F 10/10 |
| WO | WO-2023004987 | A1 | * | 2/2023 | |

* cited by examiner

*Primary Examiner* — Babajide A Demuren
(74) *Attorney, Agent, or Firm* — JEEN IP LAW, LLC

(57) ABSTRACT

Disclosed is a solar outdoor sunshade, including a sunshade main body. The sunshade main body includes a plurality of louver blades that are rotatably connected to a top of the sunshade main body, and photovoltaic panels arranged on the louver blades in an embedded manner. The sunshade main body further includes a solar controller, an inverter, and a battery arranged inside the sunshade main body, where the plurality of photovoltaic panels, the battery, and the inverter are electrically connected to the solar controller. Light energy can be converted into electrical energy and stored in the battery in the daytime for later use, through arrangement of the photovoltaic panels, the solar controller, the inverter, and the battery in the present disclosure.

9 Claims, 14 Drawing Sheets

SOLAR OUTDOOR SUNSHADE

CROSS REFERENCE TO RELATED APPLICATIONS

The present application claims the priority of Chinese patent application No. 2025200400031, filed on Jan. 8, 2025, and contents of which are incorporated herein by reference.

TECHNICAL FIELD

The present disclosure belongs to the field of outdoor sunshade equipment, and specifically relates to a solar outdoor sunshade.

BACKGROUND

An outdoor sunshade is a sunshade device mounted outdoors for users to rest and enjoy the cool. However, additional wiring and mounting of an illuminating lamp are required to use an outdoor sunshade of the prior art at night, which is cumbersome. Moreover, louver blades at a top of an ordinary outdoor sunshade are fixedly arranged, and certain gaps exist between the louver blades, such that when it rains, the outdoor sunshade cannot be used, thereby needing improvement.

SUMMARY

In view of the above defects, the present disclosure provides a solar outdoor sunshade in an example, including a sunshade main body; the sunshade main body includes a plurality of louver blades that are rotatably connected to a top of the sunshade main body, and photovoltaic panels arranged on the louver blades in an embedded manner; and the sunshade main body further includes a solar controller, an inverter, and a battery arranged inside the sunshade main body, where the plurality of photovoltaic panels, the battery, and the inverter are electrically connected to the solar controller, the photovoltaic panels are configured to receive light energy and convert the light energy into electrical energy, the solar controller is configured to convert the electrical energy generated by the photovoltaic panels into a voltage and store same in the battery, and the inverter is configured to output an inverted voltage from the battery.

Preferably, the sunshade main body further includes a frame formed by combining a plurality of cross beams and a plurality of corner codes, and the frame is of a rectangular ring structure or a circular ring structure.

Preferably, the plurality of corner codes are of an arch-shaped structure or a L-shape structure, and the plurality of corner codes are fixedly arranged at four corners of the frame.

Preferably, the corner codes are of a hollow structure, each of the corner codes is provided with a water inlet hole penetrating through the corner code, the water inlet hole is communicated with an internal cavity of the corner code, a bottom end of each of the corner codes is provided with a water outlet end, the water outlet end is connected to a water pipe, and the water outlet end is communicated with the water inlet hole.

Preferably, the sunshade main body further includes vertical rods that are fixedly connected to the plurality of corner codes, the vertical rods are of the hollow structure with both ends through with each other, a drainage end is arranged close to a bottom of each of the vertical rods, and a baffle is rotatably connected to a drainage outlet of the drainage end; and one end of the water pipe is connected to the water outlet end, and the other end of the water pipe penetrates through the vertical rod and is communicated with the drainage end.

Preferably, an inner side of the frame is annularly provided with a fixedly connected annular water channel, a drainage nozzle extending into inside of the corner code is arranged at a position of the annular water channel corresponding to the water inlet hole, the drainage nozzle is provided with a filter net, and the drainage nozzles are arranged in one-to-one correspondence with the water inlet holes in the plurality of corner codes; and a sealing gasket is fixedly arranged at a top of an inner side wall of the annular water channel.

Preferably, a water flow groove of a certain depth is formed at one end of each of the plurality of louver blades in a length direction, an opposite end of the water flow groove protrudes forward to form an inwardly rolled rain baffle, and the water flow groove extends into the corresponding annular water channel from opposite sides thereof.

Preferably, the sunshade main body further includes a crank assembly for controlling opening and closing of the louver blades, and the crank assembly includes a reversing mechanism fixedly connected to the frame, and a crank that is detachably or fixedly connected to a vertical rotating shaft of the reversing mechanism, where a horizontal rotating shaft of the reversing mechanism penetrates through a corresponding frame and extends to an inner side of the frame, a push rod is fixedly connected to the horizontal rotating shaft thereof, the push rod is arranged horizontally or inclined upward, and the push rod is provided with a stroke hole.

Preferably, left and right sides of a front end of each of the plurality of louver blades are rotatably connected to two opposite cross beams of the frame through rotating shafts, and the sunshade main body further includes linkage rods arranged on opposite sides (left and right sides) of the plurality of louver blades, and left and right sides of a rear end of each of the louver blades are rotatably connected to the linkage rods in one-to-one correspondence; and a shaft rod of a certain length is arranged on the corresponding linkage rod on a side of the reversing mechanism, and the shaft rod extends into the stroke hole of the push rod; and when the reversing mechanism rotates axially toward left or right, the push rod rotates synchronously, and pushes the linkage rod to move up and down, such that each of the louver blades can be opened and closed.

Preferably, the sunshade main body further includes a control panel and at least one LED lamp, where the LED lamp is arranged at a bottom of the corresponding louver blade, at a bottom of the frame, or on the corresponding vertical rod in an embedded manner, and the LED lamp, the inverter, and the battery are all electrically connected to the control panel.

The above at least one technical solution adopted in the examples of the present disclosure can achieve the following beneficial effects:

1. light energy can be converted into electrical energy and stored in the battery in the daytime for later use, through arrangement of the photovoltaic panels, the solar controller, the inverter, and the battery in the present disclosure;
2. due to arrangement of the LED lamp, illumination can be achieved at night by using the electrical energy stored in the battery, which is very convenient; and 3. the crank assembly is arranged to facilitate control over the louver blades rotatably connected to the frame, including the opening and closing of the louver blades, which enriches usage scenarios of the sunshade and has strong practicality.

BRIEF DESCRIPTION OF THE DRAWINGS

The accompanying drawings described herein are used for providing further understanding of present disclosure, and constitute part of the present disclosure. Illustrative examples and their descriptions of the present disclosure are intended to explain the present disclosure, but not constitute an undue limitation on the present disclosure. Reference numerals in the figures.

DETAILED DESCRIPTIONS OF THE EMBODIMENTS

In order to make the objectives, technical solutions and advantages of the present disclosure clearer, the technical solutions of the present disclosure will be clearly and completely described with reference to specific examples and corresponding accompanying drawings of the present disclosure. Apparently, the examples described are merely some rather than all of the examples of the present disclosure. Based on the examples of the present disclosure, all other examples acquired by those of ordinary skill in the art without making creative efforts fall within the scope of protection of the present disclosure.

The technical solutions provided in various examples of the present disclosure will be described in detail below with reference to the accompanying drawings.

Figure 1:
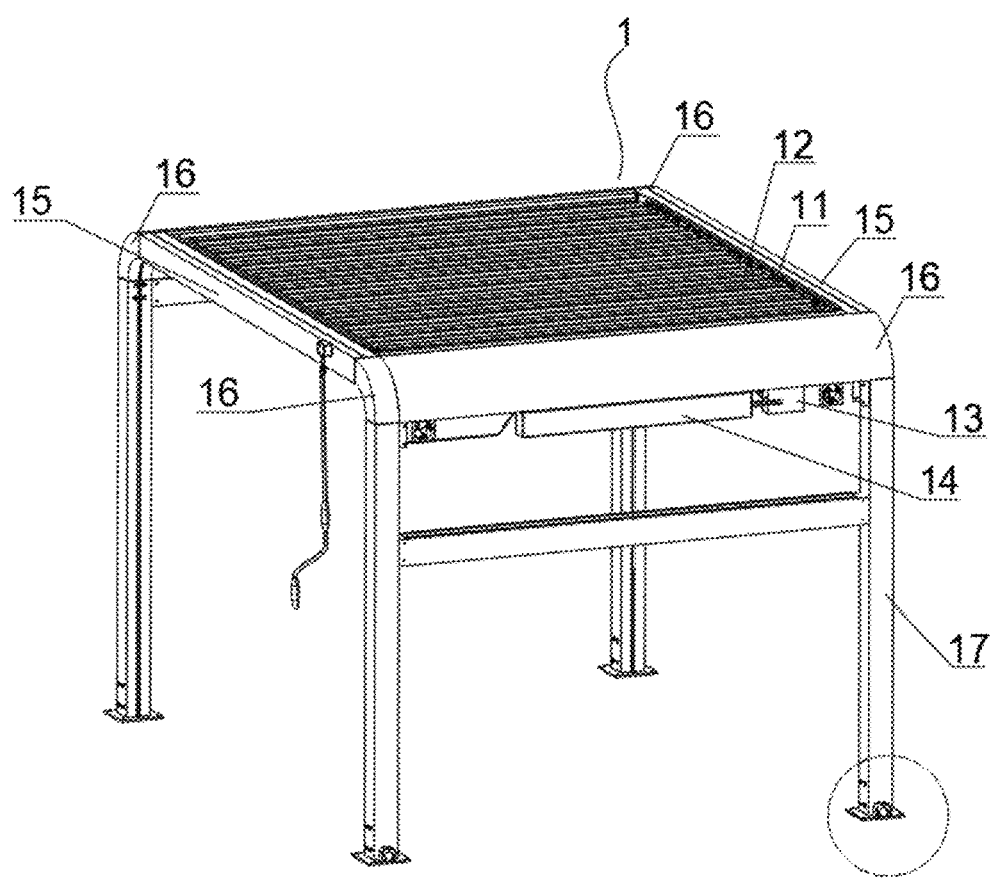
FIG. 1 is a schematic diagram of an overall structure of the present disclosure.
Figure 2:
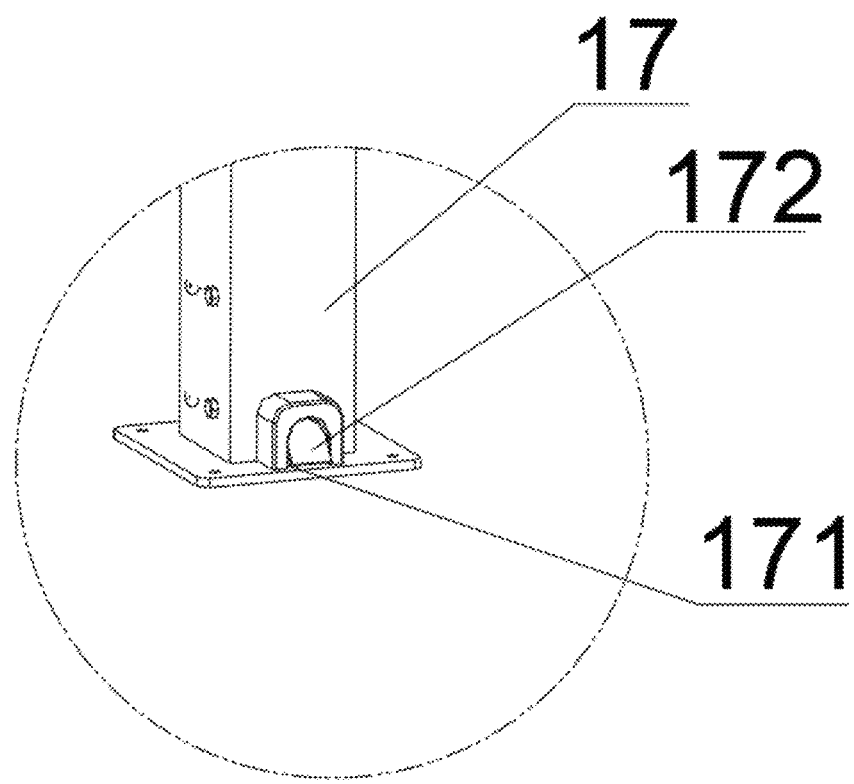
FIG. 2 is an enlarged view of a partial structure of FIG. 1 in the present disclosure.
Figure 3:
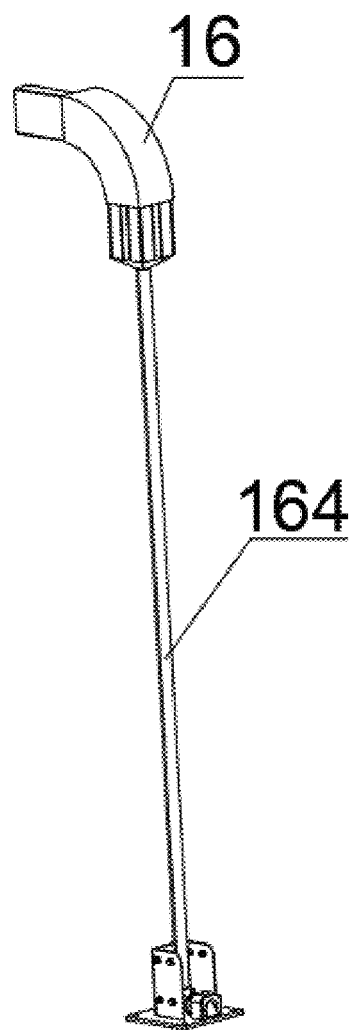
FIG. 3 is a state diagram of connection between a corner code, a water pipe and a drainage end in the present disclosure.
Figure 4:
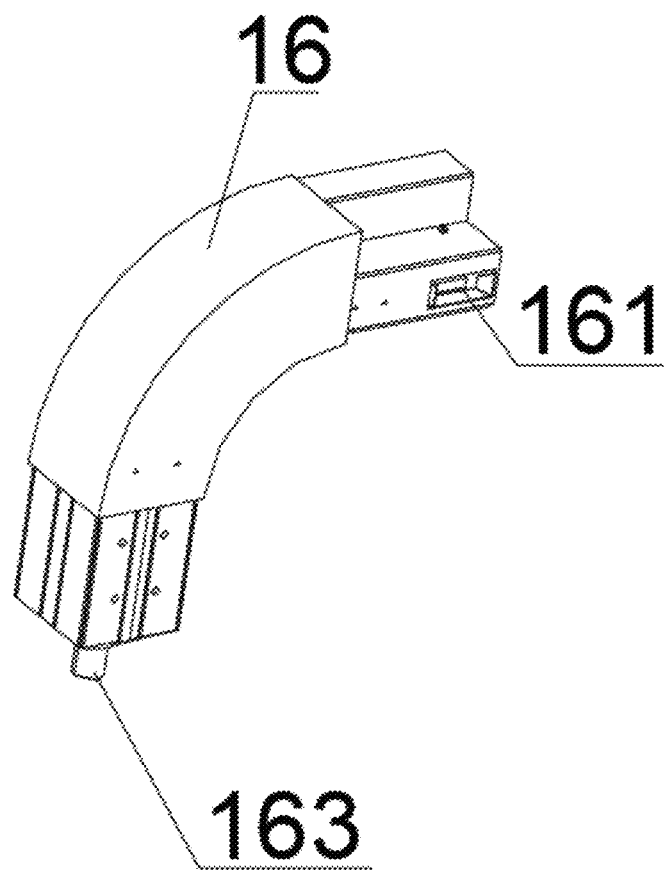
FIG. 4 is a structural schematic diagram of a corner code in the present disclosure.
Figure 5:
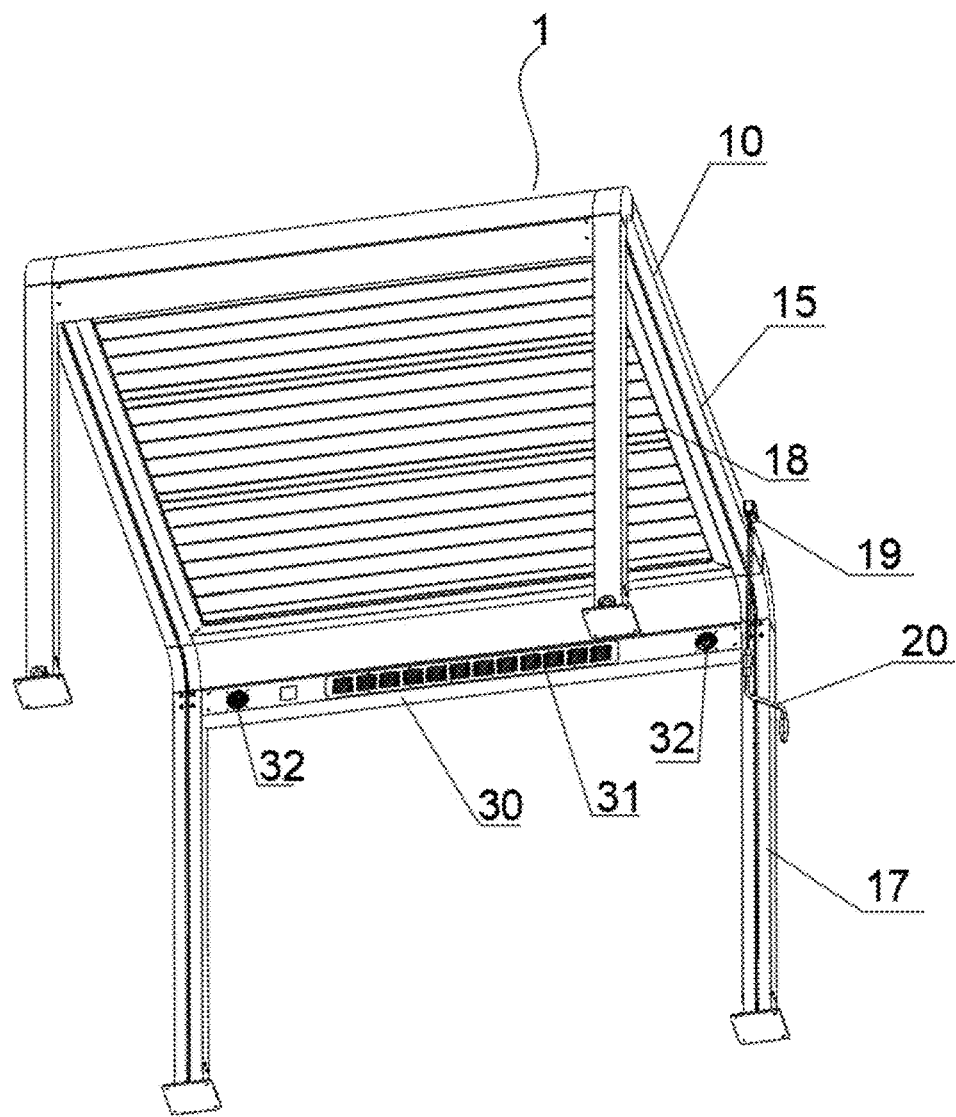
FIG. 5 is a space diagram of a sunshade main body in the present disclosure.
Figure 6:
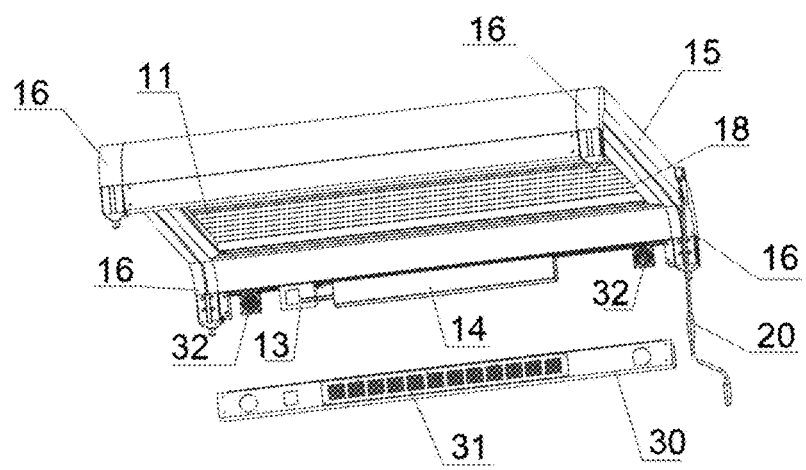
FIG. 6 is a schematic diagram of an internal structure of a housing of the present disclosure.
Figure 7:
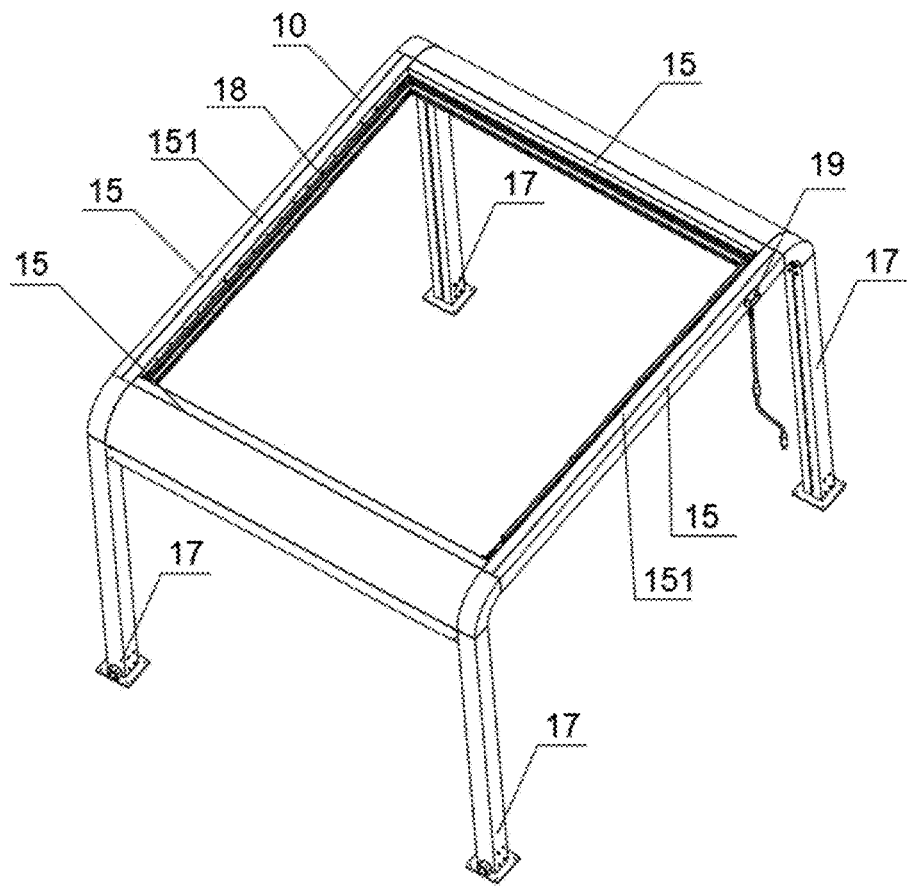
FIG. 7 is a state diagram of mounting of a frame, an annular water channel and a vertical rod in the present disclosure.

With reference to FIGS. 1 and 6, the present disclosure provides a solar outdoor sunshade, including a sunshade main body 1; the sunshade main body 1 includes a plurality of louver blades 11 that are rotatably connected to a top of the sunshade main body 1, and photovoltaic panels 12 arranged on the louver blades 11 in an embedded manner, where the louver blades 11 are arranged opposite to each other in a front-and-back direction; the sunshade main body 1 further includes a solar controller 13, an inverter, and a battery 14 arranged inside the sunshade main body 1, where the plurality of photovoltaic panels 12, the battery 14, and the inverter are electrically connected to the solar controller 13, the photovoltaic panels 12 are configured to receive light energy and convert the light energy into electrical energy, the solar controller 13 is configured to convert the electrical energy generated by the photovoltaic panels 12 into a voltage and store same in the battery 14, and the inverter is configured to output an inverted voltage from the battery 14; and in this way, light energy can be converted into electrical energy and stored in the battery 14 in the daytime for later use, through arrangement of the photovoltaic panels 12, the solar controller 13, the inverter, and the battery 14 in the present disclosure.

With reference to FIGS. 2-16, the sunshade main body 1 further includes a frame 10 formed by combining a plurality of cross beams 15 and a plurality of corner codes 16, the frame 10 is of a rectangular ring structure or a circular ring structure, the plurality of corner codes 16 are of an arch-shaped structure or a L-shape structure, and the plurality of corner codes 16 are fixedly arranged at four corners of the frame 10; in this example, the frame 10 is of the rectangular ring structure formed by combining four cross beams 15 and four structurally identical corner codes 16, where the corner codes 16 are of the arch-shaped structure, the cross beams 15 are of a hollow structure with both ends through with each other, and an upper end of each of the corner codes 16 is inserted into corresponding ends of two relatively parallel cross beams 15 and fixed by screws or welding; each of the cross beams 15 includes a cover plate 151, the cover plate 151 is detachably connected to the cross beam 15 in a snap-fit manner, and the cover plate 151 is located above an annular water channel 18 to facilitate cleaning of the annular water channel 18 by a user; the corner codes 16 are of the hollow structure, each of the corner codes 16 is provided with a water inlet hole 161 penetrating through the corner code 16, the water inlet hole 161 is communicated with an internal cavity of the corner code 16, a bottom end of each of the corner codes 16 is provided with a water outlet end 163, the water outlet end 163 is connected to a water pipe 164, and the water outlet end 163 is communicated with the water inlet hole 161; the sunshade main body 1 further includes vertical rods 17 that are fixedly connected to the plurality of corner codes 16, the vertical rods 17 are of the hollow structure with both ends through with each other, a drainage end 171 is arranged close to a bottom of each of the vertical rods 17, a baffle 172 is rotatably connected to a drainage outlet of the drainage end 171, the baffle 172 is connected to the drainage outlet through a rotating shaft, a shaft core of the rotating shaft is arranged in a middle or close to a top of the baffle 172, and when no rainwater flows through the drainage outlet, the baffle 172 blocks the drainage outlet under the action of gravity, with a higher overall flatness; one end of the water pipe 164 is connected to the water outlet end 163, and the other end of the water pipe 164 penetrates through the vertical rod 17 and is communicated with the drainage end 171; an inner side of the frame 10 is annularly provided with the fixedly connected annular water channel 18, a drainage nozzle 181 extending into inside of the corner code 16 is arranged at a position of the annular water channel 18 corresponding to the water inlet hole 161, the drainage nozzle 181 penetrates through the corresponding cross beam 15, the drainage nozzle 181 is provided with a filter net 183 to prevent leaves and other debris from blocking the water pipe 164, and the drainage nozzles 181 are arranged in one-to-one correspondence with the water inlet holes 161 in the plurality of corner codes 16; a sealing gasket 182 is fixedly arranged at a top of an inner side wall of the annular water channel 18, the sealing gasket 182 is in contact with a position corresponding to a bottom surface of the louver blade 11 to enhance airtightness thereof and prevent rainwater in the annular water channel 18 from leaking into the sunshade; a water flow groove 100 of a certain depth is formed at one end of each of the plurality of louver blades 11 in a length direction, an opposite end of the water flow groove 100 protrudes forward to form an inwardly rolled rain baffle 101, and the water flow groove 100 extends into the corresponding annular water channel 18 from opposite sides thereof; and in this way, when it rains, rainwater drips onto the louver blades 11 and flows into the water flow grooves 100 along the louver blades 11, rainwater in each of the water flow grooves 100 flows into the corresponding annular water channels 18 on opposite sides thereof, then rainwater flows through the drainage nozzles 181 into inside of the corner codes 16 and finally flows out through the water pipes 164 and the drainage outlets of and the drainage ends 171, and when rainwater flows, a certain thrust is generated, causing the baffles 172 at the drainage ends 171 to be opened.

Wither reference to FIGS. 1-16, in some examples, the sunshade main body 1 further includes a crank assembly for controlling opening and closing of the louver blades 11, and the crank assembly includes a reversing mechanism 19 fixedly connected to the frame 10, and a crank 20 that is detachably or fixedly connected to a vertical rotating shaft of the reversing mechanism 19, where a horizontal rotating shaft of the reversing mechanism 19 penetrates through a corresponding frame and extends to an inner side of the frame 10, a push rod 21 is fixedly connected to the horizontal rotating shaft thereof, the horizontal rotating shaft of the crank assembly is a power output end, and the vertical rotating shaft thereof is a power input end; the push rod 21 is arranged horizontally or inclined upward, the push rod 21 is provided with a stroke hole 211 of a certain length, and left and right sides of a front end of each of the plurality of louver blades 11 are rotatably connected to two opposite cross beams 15 of the frame 10 through rotating shafts; the sunshade main body 1 further includes linkage rods 22 arranged on opposite sides (left and right sides) of the plurality of louver blades 11, and left and right sides of a rear end of each of the louver blades 11 are rotatably connected to the linkage rods 22 in one-to-one correspondence; a shaft rod 221 of a certain length is arranged on the corresponding linkage rod 22 on a side of the reversing mechanism 19, and the shaft rod 221 extends into the stroke hole 211 of the push rod 21; when the reversing mechanism 19 rotates axially toward left or right, the push rod 21 rotates synchronously, and pushes the linkage rod 22 to move up and down, and the shaft rod 221 on the linkage rod 22 slides back and forth in the stroke hole 211, such that each of the louver blades 11 can be opened and closed; on a rainy day, when the crank 20 is rotated, the horizontal rotating shaft of the reversing mechanism 19 rotates toward left or right, and in cooperation with the push rod 21 fixed on the horizontal rotating shaft, the linkage rod 22 moves downward when the push rod 21 rotates toward left or right; when each of the louver blades 11 is in fitted contact with the corresponding sealing gasket 182 on the annular water channel 18, the louver blades 11 are closed, which effectively prevents rainwater from entering the sunshade; and the crank assembly is arranged to facilitate control over the louver blades 11 rotatably connected to the frame 10, including the opening and closing of the louver blades 11 in a very convenient manner, which enriches usage scenarios of the sunshade.

Figure 8:
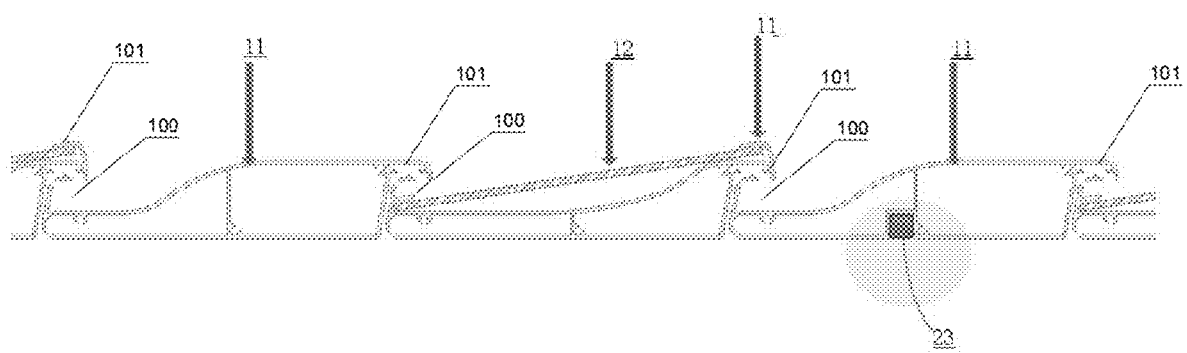
FIG. 8 is a structural schematic diagram of a louver blade, a photovoltaic panel and an LED lamp in the present disclosure.
Figure 9:
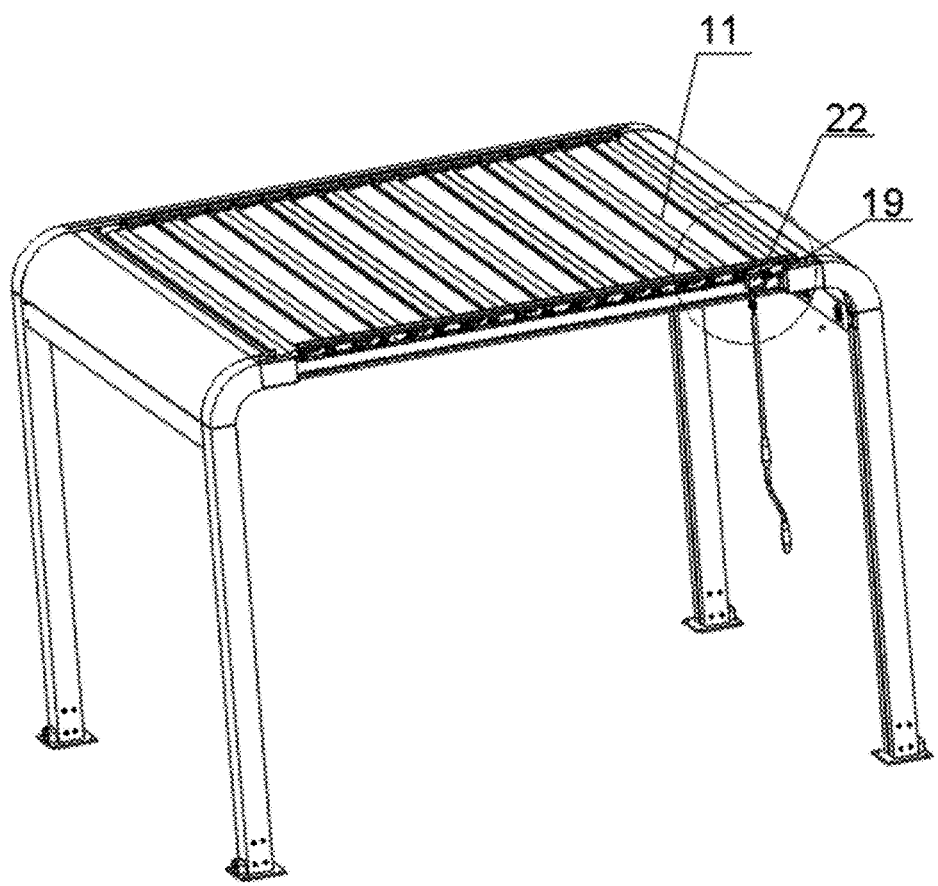
FIG. 9 is a structural schematic diagram of connection between a crank assembly and a louver blade in the present disclosure.
Figure 10:
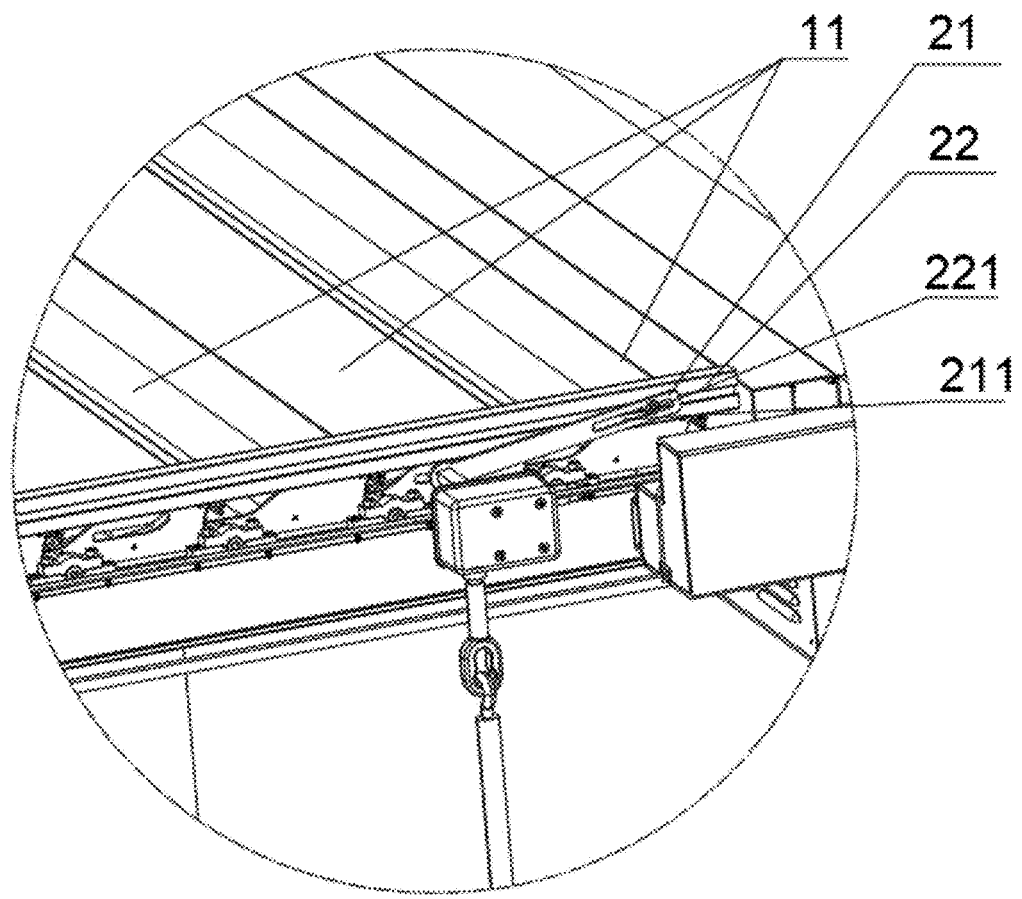
FIG. 10 is an enlarged view of a partial structure of FIG. 9 in the present disclosure.
Figure 11:
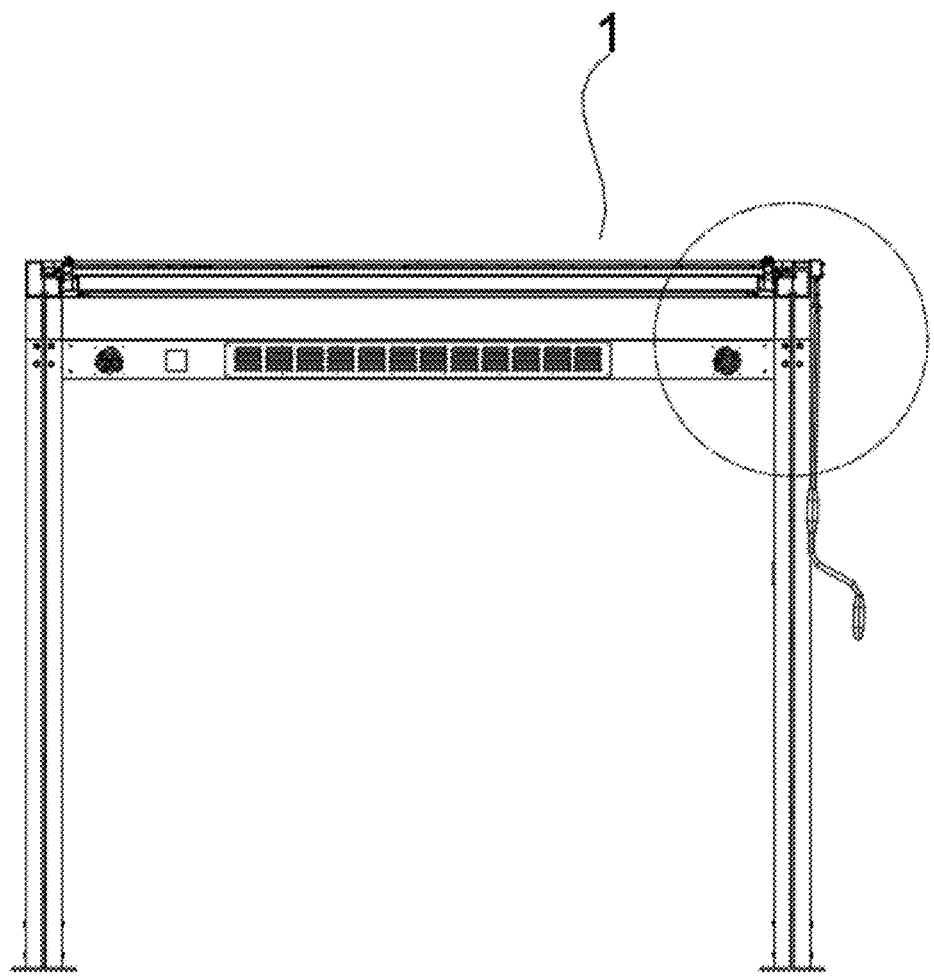
FIG. 11 is a sectional view of an overall structure of the present disclosure.
Figure 12:
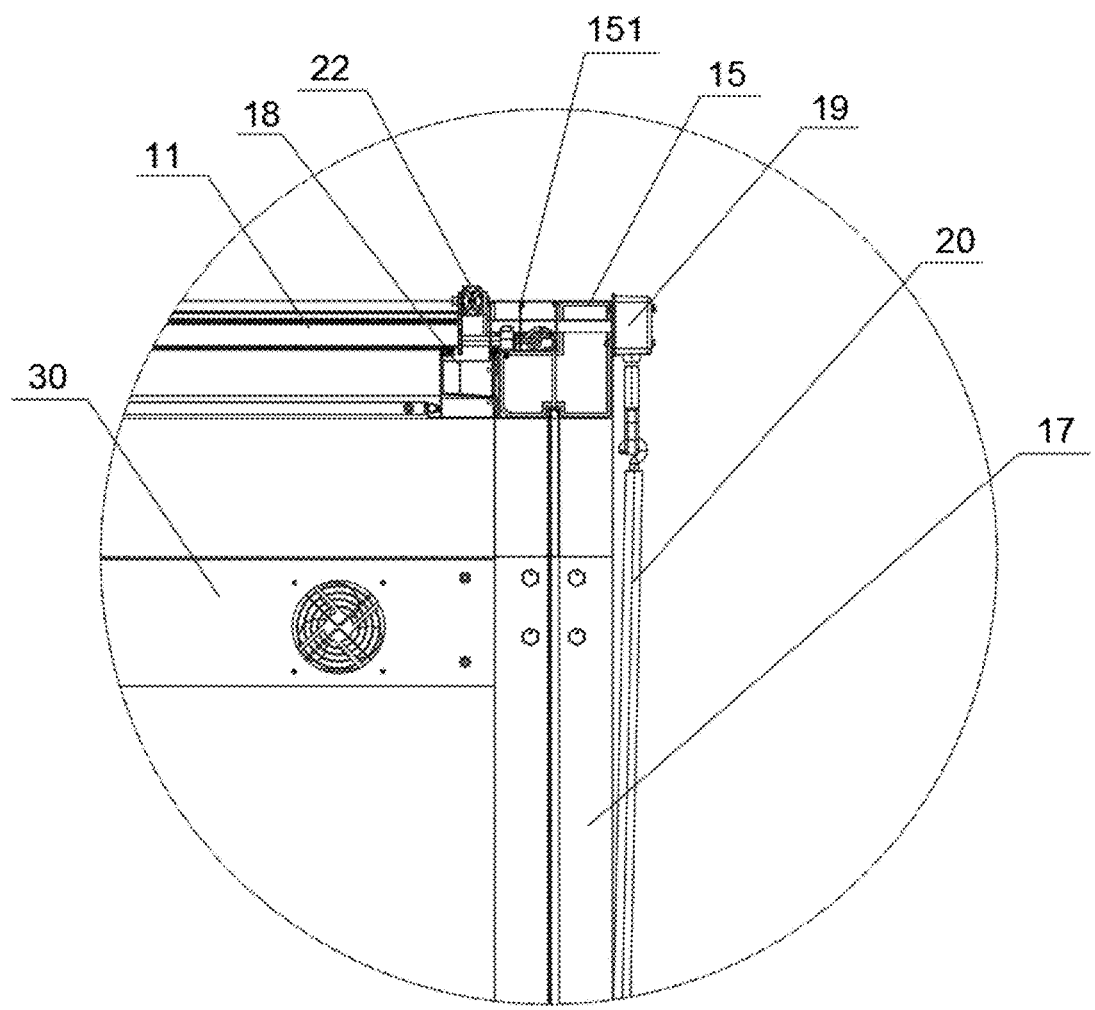
FIG. 12 is an enlarged view of a partial structure of FIG. 11 in the present disclosure.
Figure 13:
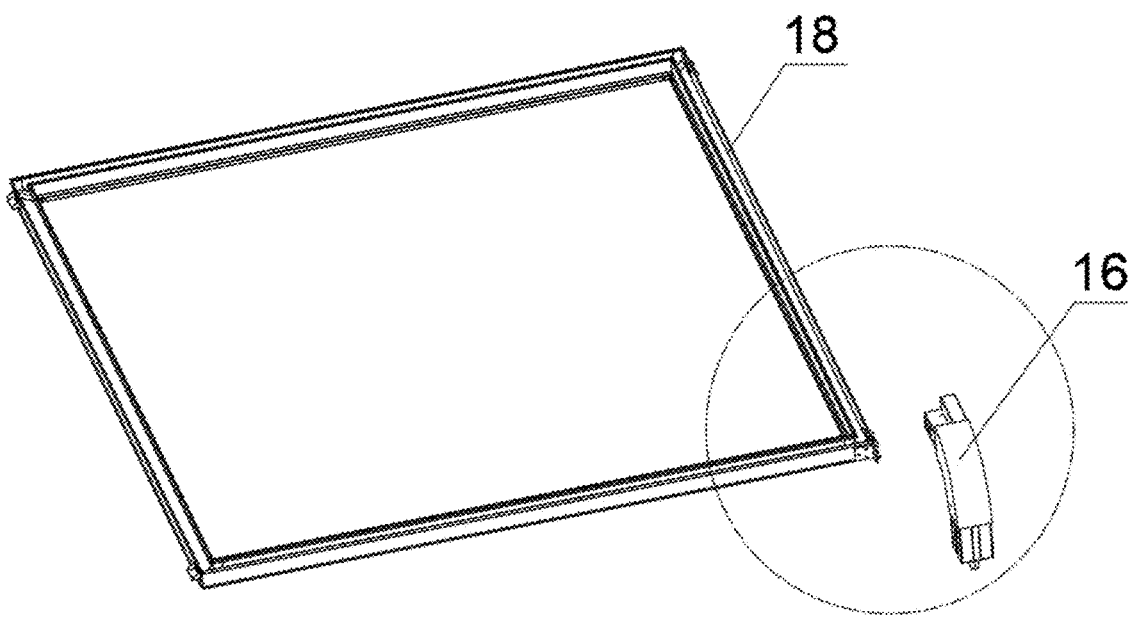
FIG. 13 is a structural schematic diagram of an annular water channel and a corner code in the present disclosure.
Figure 14:
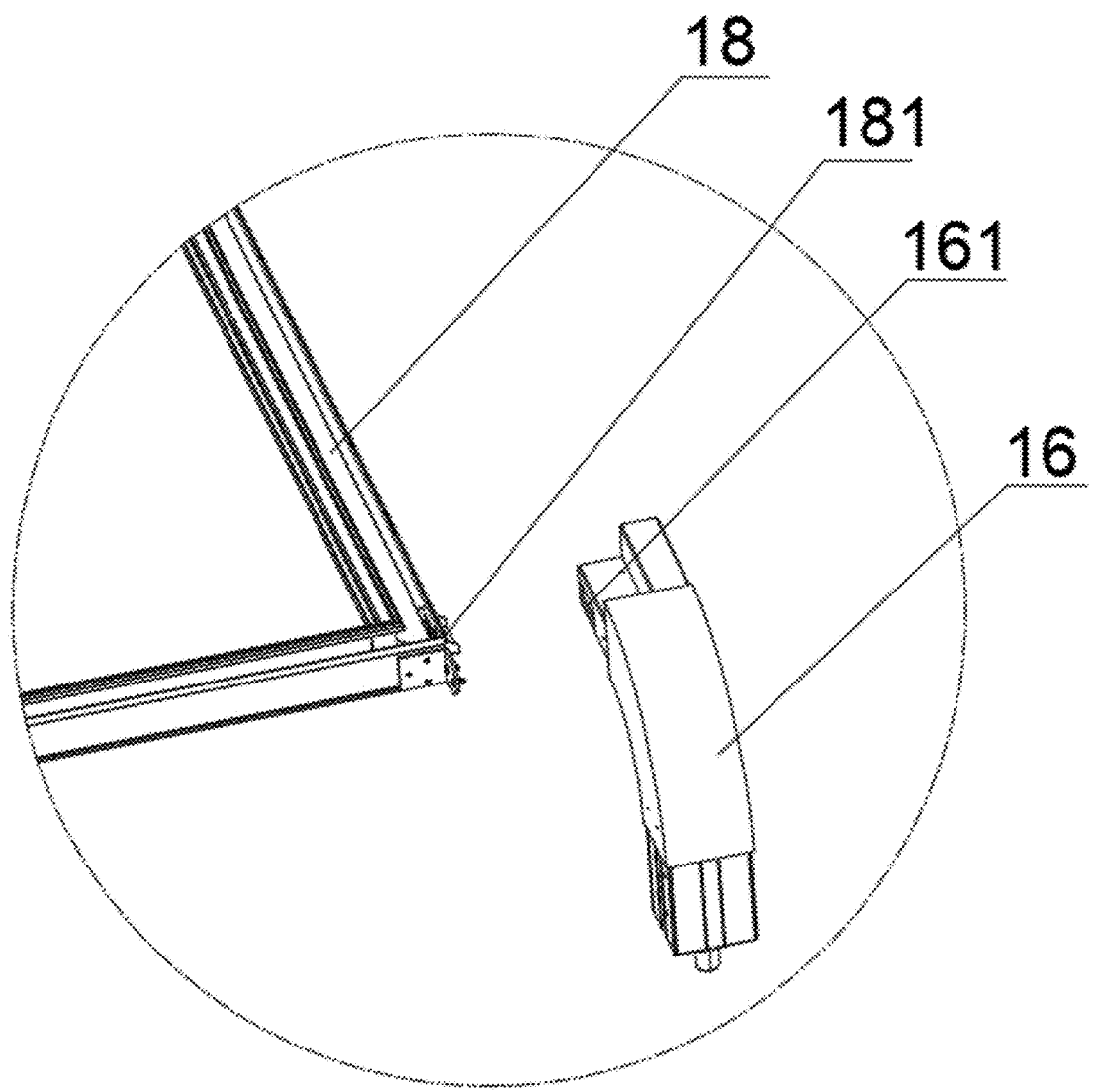
FIG. 14 is an enlarged view of a partial structure of FIG. 13 in the present disclosure.
Figure 15:
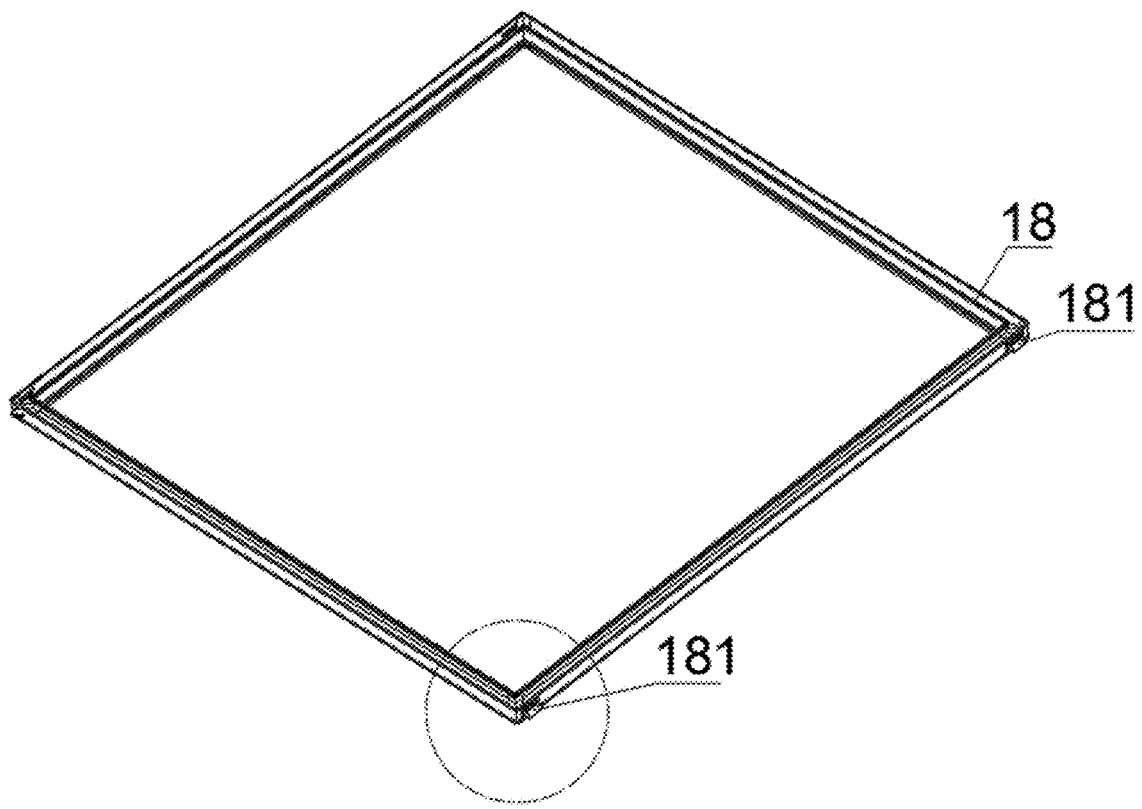
FIG. 15 is a structural schematic diagram of an annular water channel of the present disclosure.
Figure 16:
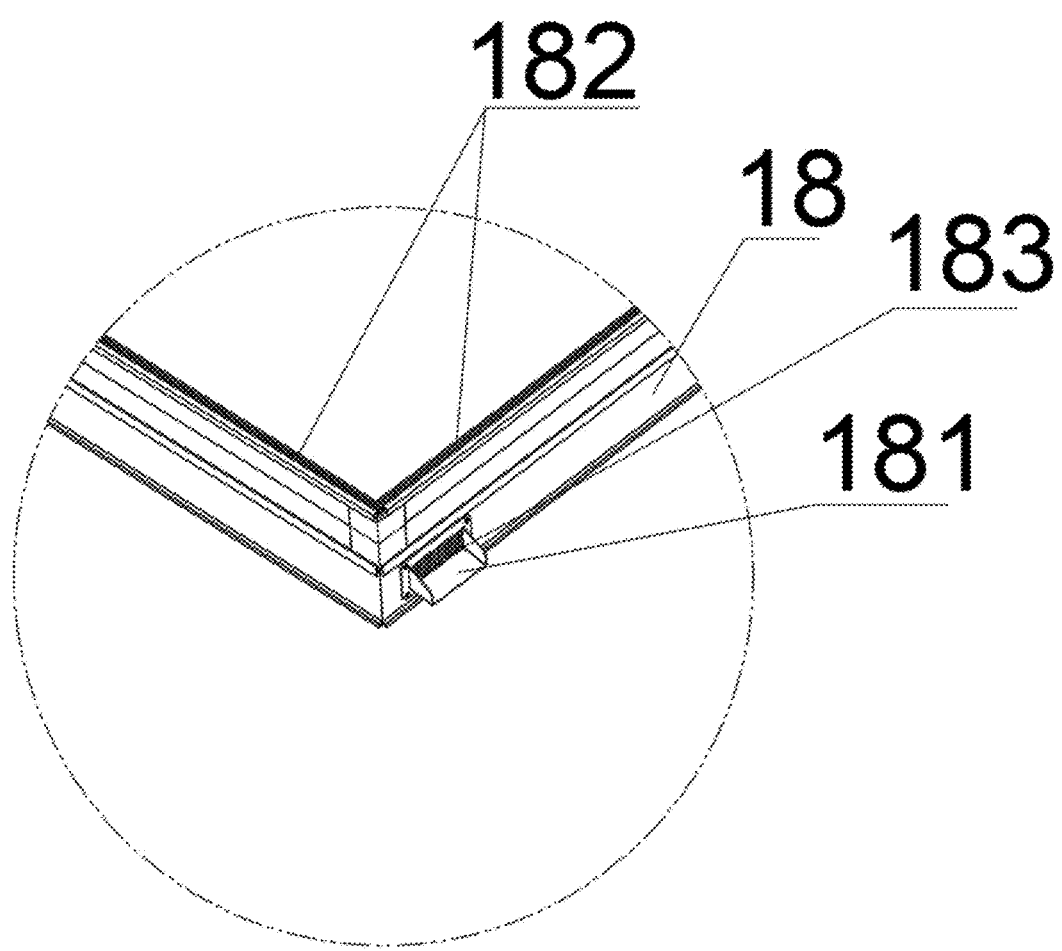
FIG. 16 is an enlarged view of a partial structure of FIG. 15 in the present disclosure.

With reference to FIGS. 6 and 8, in some examples, the sunshade main body 1 further includes a control panel and at least one LED lamp 23, where the LED lamp 23 is arranged at a bottom of the corresponding louver blade 11, at a bottom of the frame, or on the corresponding vertical rod 17 in an embedded manner; the solar controller 13, the LED lamp 23, the inverter 13, and the battery 14 are all electrically connected to the control panel; in this example, the LED lamp 23 is arranged at the bottom of the corresponding louver blade 11 in an embedded manner; the sunshade main body 1 further includes a housing 30 fixedly arranged at a bottom of each of the cross beams 15, where the solar controller 13, the inverter, the battery 14 and the control panel are all mounted inside this housing 30, and the battery 14 is arranged on a side of the solar controller 13; the housing 30 is further provided with a heat dissipation hole penetrating through the housing 30, a net cover 31 is arranged above the heat dissipation hole, two through holes communicated with inside of the housing 30 are formed in both sides of the net cover 31, and a heat dissipation fan 32 is mounted inside either of the two through holes, such that heat dissipation and cooling inside the housing 30 can be achieved; the control panel is further provided with a Bluetooth communication module or an infrared signal receiving module, and the opening and closing of the LED lamp 23 can be controlled through a compatible Bluetooth remote control or infrared remote control; and Due to arrangement of the LED lamp 23, illumination can be achieved at night by using the electrical energy stored in the battery 14, without need for additional wiring, which is very convenient.

The foregoing descriptions are merely examples of the present disclosure, and are not intended to limit the present disclosure. Various modifications and changes may be made by those skilled in the art. Any modifications, equivalent substitutions, improvements and the like within the spirit and principles of the present disclosure shall fall within the protection scope indicated in the claims of the present disclosure.

What is claimed is:

1. A solar outdoor sunshade, comprising a sunshade main body,
wherein the sunshade main body comprises a plurality of louver blades that are rotatably connected to a top of the sunshade main body, and photovoltaic panels arranged on the louver blades in an embedded manner; the sunshade main body further comprises a solar controller, an inverter, and a battery arranged inside the sunshade main body, wherein the plurality of photovoltaic panels, the battery, and the inverter are electrically connected to the solar controller, the photovoltaic panels are configured to receive light energy and convert the light energy into electrical energy, the solar controller is configured to convert the electrical energy generated by the photovoltaic panels into a voltage and store same in the battery, and the inverter is configured to output an inverted voltage from the battery;

wherein an inner side of the frame is annularly provided with a fixedly connected annular water channel;

wherein a water flow groove of a certain depth is formed at one end of each of the plurality of louver blades in a length direction, an opposite end of the water flow groove protrudes forward to form an inwardly rolled rain baffle, and the water flow groove extends into the corresponding annular water channel from opposite sides thereof.

2. The solar outdoor sunshade according to claim 1, wherein the sunshade main body further comprises a frame formed by combining a plurality of cross beams and a plurality of corner codes, and the frame is of a rectangular ring structure or a circular ring structure.

3. The solar outdoor sunshade according to claim 2, wherein the plurality of corner codes are of an arch-shaped structure or a L-shape structure, and the plurality of corner codes are fixedly arranged at four corners of the frame.

4. The solar outdoor sunshade according to claim 2, wherein the corner codes are of a hollow structure, each of the corner codes is provided with a water inlet hole penetrating through the corner code, the water inlet hole is communicated with an internal cavity of the corner code, a bottom end of each of the corner codes is provided with a water outlet end, the water outlet end is connected to a water pipe, and the water outlet end is communicated with the water inlet hole.

5. The solar outdoor sunshade according to claim 4, wherein the sunshade main body further comprises vertical rods that are fixedly connected to the plurality of corner codes, the vertical rods are of the hollow structure with both ends through with each other, a drainage end is arranged close to a bottom of each of the vertical rods, and a baffle is rotatably connected to a drainage outlet of the drainage end; and one end of the water pipe is connected to the water outlet end, and the other end of the water pipe penetrates through the vertical rod and is communicated with the drainage end.

6. The solar outdoor sunshade according to claim 2, wherein a drainage nozzle extending into inside of the corner code is arranged at a position of the annular water channel corresponding to the water inlet hole, the drainage nozzle is provided with a filter net, and the drainage nozzles are arranged in one-to-one correspondence with the water inlet holes in the plurality of corner codes; and a sealing gasket is fixedly arranged at a top of an inner side wall of the annular water channel.

7. The solar outdoor sunshade according to claim 1, wherein the sunshade main body further comprises a crank assembly for controlling opening and closing of the louver blades, and the crank assembly comprises a reversing mechanism fixedly connected to the frame, and a crank that is detachably or fixedly connected to a vertical rotating shaft of the reversing mechanism, wherein a horizontal rotating shaft of the reversing mechanism penetrates through a corresponding frame and extends to an inner side of the frame, a push rod is fixedly connected to the horizontal rotating shaft thereof, the push rod is arranged horizontally or inclined upward, and the push rod is provided with a stroke hole.

8. The solar outdoor sunshade according to claim 1, wherein left and right sides of a front end of each of the plurality of louver blades are rotatably connected to two opposite cross beams of the frame through rotating shafts, and the sunshade main body further comprises linkage rods arranged on opposite sides (left and right sides) of the plurality of louver blades, and left and right sides of a rear end of each of the louver blades are rotatably connected to the linkage rods in one-to-one correspondence; and a shaft rod of a certain length is arranged on the corresponding linkage rod on a side of the reversing mechanism, and the shaft rod extends into the stroke hole of the push rod; and when the reversing mechanism rotates axially toward left or right, the push rod rotates synchronously, and pushes the linkage rod to move up and down, such that each of the louver blades can be opened and closed.

9. The solar outdoor sunshade according to claim 1, wherein the sunshade main body further comprises a control panel and at least one LED lamp, wherein the LED lamp is arranged at a bottom of the corresponding louver blade, at a bottom of the frame, or on the corresponding vertical rod in an embedded manner, and the LED lamp, the inverter, and the battery are all electrically connected to the control panel.

\* \* \* \* \*